(12) United States Patent
Himukashi

(10) Patent No.: US 11,703,948 B2
(45) Date of Patent: Jul. 18, 2023

(54) IMAGE ADJUSTMENT SYSTEM, IMAGE ADJUSTMENT DEVICE, AND IMAGE ADJUSTMENT METHOD

(71) Applicant: JVCKENWOOD Corporation, Yokohama (JP)

(72) Inventor: Takashi Himukashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 198 days.

(21) Appl. No.: 17/363,614

(22) Filed: Jun. 30, 2021

(65) Prior Publication Data

US 2021/0325965 A1    Oct. 21, 2021

Related U.S. Application Data

(63) Continuation of application No. PCT/JP2020/005239, filed on Feb. 12, 2020.

(30) Foreign Application Priority Data

Feb. 15, 2019   (JP) .................................. 2019-025464
Feb. 15, 2019   (JP) .................................. 2019-025473

(51) Int. Cl.
*G06F 3/01*      (2006.01)
*H04N 5/232*   (2006.01)
(Continued)

(52) U.S. Cl.
CPC ................ *G06F 3/014* (2013.01); *G06T 3/60* (2013.01); *H04N 23/683* (2023.01); *H04N 23/698* (2023.01)

(58) Field of Classification Search
CPC ........ G06F 3/014; G06F 3/011; G06F 3/0304; G06F 3/0481; G06F 3/0484; G06T 3/60;
(Continued)

(56) References Cited

U.S. PATENT DOCUMENTS 11,134,191 B2 *   9/2021   Zhao ..................... G06F 16/909
11,266,919 B2 *   3/2022   Bear ....................... G06F 3/046
(Continued)

FOREIGN PATENT DOCUMENTS

JP        2005-56295 A       3/2005
JP       2005-319136 A      11/2005
(Continued)

OTHER PUBLICATIONS

Japanese Search Report for corresponding application 2019-025473 dated Oct. 25, 2022.

(Continued)

*Primary Examiner* — Bryan Earles
(74) *Attorney, Agent, or Firm* — Nath, Goldberg & Meyer; Jerald L. Meyer

(57) ABSTRACT

In an image adjustment system, an image display device displays a captured image that is adjusted by an image adjustment device. The image adjustment device includes an image processor and an image generator. The image generator generates a spherical surface image. The image processor acquires the spherical surface image from the image generator to display the spherical surface image on the image display device on the basis of instruction information output from a controller. The image generator adjusts the captured image in accordance with a rotation of the spherical surface image, corrects camera shake in the captured image adjusted, and determines that a travel direction of a camera is changed when the captured image that is camera-shake corrected is changed by a predetermined angle or greater.

11 Claims, 5 Drawing Sheets

(51) Int. Cl.
*G06T 3/60* (2006.01)
*H04N 23/68* (2023.01)
*H04N 23/698* (2023.01)

(58) Field of Classification Search
CPC .... G06T 19/00; H04N 23/683; H04N 23/698; H04N 7/18; G02B 27/02; G09G 5/00; G09G 5/34; G09G 5/36; G09G 5/38
See application file for complete search history.

(56) References Cited

U.S. PATENT DOCUMENTS

| | | | |
|---|---|---|---|
| 2013/0044229 A1* | 2/2013 | Noguchi | H04N 23/667 348/E5.078 |
| 2017/0278262 A1* | 9/2017 | Kawamoto | H04N 5/64 |
| 2018/0122042 A1* | 5/2018 | Kim | G06F 3/011 |
| 2018/0376130 A1* | 12/2018 | Takematsu | H04N 23/662 |
| 2019/0208141 A1* | 7/2019 | Oyama | G06T 7/70 |
| 2019/0212827 A1* | 7/2019 | Kin | G02B 27/0172 |
| 2020/0050263 A1* | 2/2020 | Wu | G06F 3/013 |
| 2020/0192099 A1* | 6/2020 | Byun | H04N 23/681 |

FOREIGN PATENT DOCUMENTS

| | | |
|---|---|---|
| JP | 2007-116538 A | 5/2007 |
| JP | 2010256534 A | 11/2010 |
| JP | 2013-171083 A | 9/2013 |
| JP | 2015-194643 A | 11/2015 |
| JP | 2016082411 A | 5/2016 |
| JP | 2017-215875 A | 12/2017 |
| JP | 2018026105 A | 2/2018 |

OTHER PUBLICATIONS

Office Action dated Jun. 28, 2022 in the counterpart Japanese application No. 2019-025473.

* cited by examiner

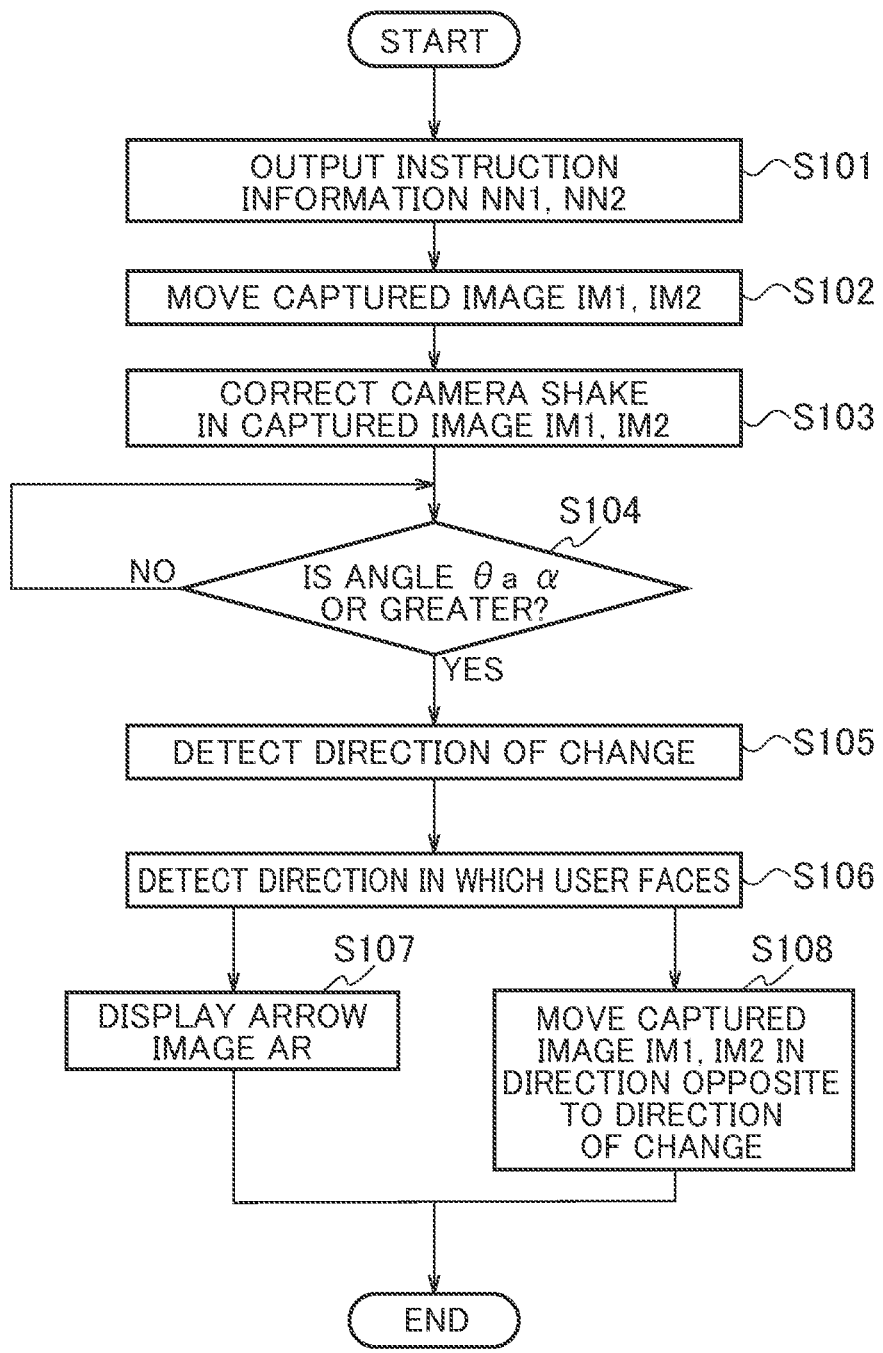

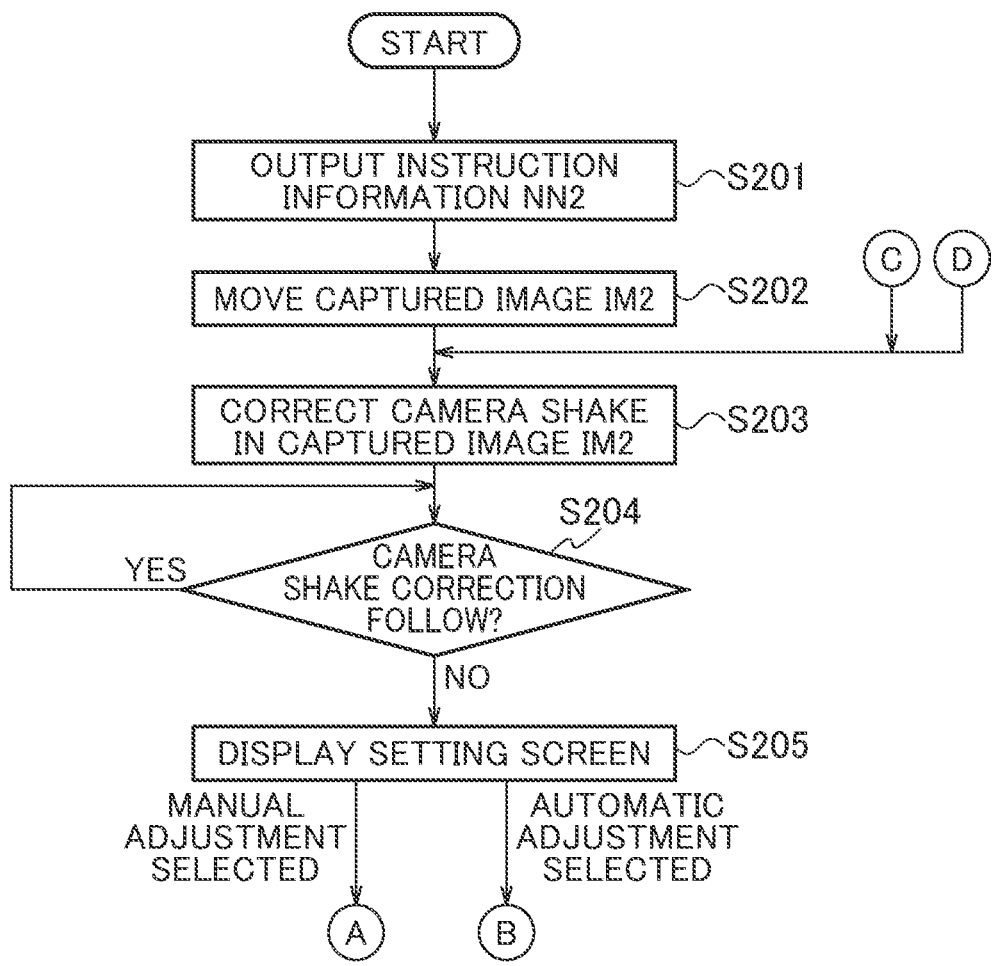

IMAGE ADJUSTMENT SYSTEM, IMAGE ADJUSTMENT DEVICE, AND IMAGE ADJUSTMENT METHOD

CROSS REFERENCE TO RELATED APPLICATION

This is a continuation application on the basis of PCT application No. PCT/JP2020/005239 filed on Feb. 12, 2020, which claims the benefit of priority from Japanese Patent Applications No. 2019-025464 and No. 2019-025473 filed on Feb. 15, 2019, the entire contents of which are incorporated by reference herein.

BACKGROUND

The present invention relates to an image adjustment system, an image adjustment device, and an image adjustment method.

A head-mounted display has recently attracted attention as an image display device. The head-mounted display, while being mounted on the head of the user, can provide a user with a sense (immersion) of entering a virtual space by displaying an image. As described in Japanese Patent Application Laid-Open No. 2005-56295 (Patent Document 1), the head-mounted display can display an image captured by an external camera through a network.

The head-mounted display displays an image captured by using an omnidirectional camera capable of capturing the range of 360 degrees, and thus the user can obtain a feeling that the user is viewing the range of 360 degrees around the user. The head-mounted display displays an image captured by using a stereo camera capable of capturing a right-eye image and a left-eye image as the omnidirectional camera, and thus the user can view the image displayed on the head-mounted display in three dimensions.

A camera shake correction function reduces the shake of the image captured by the camera and maintains the image in a constant state when the direction of the camera is changed. However, when the travel direction of the omnidirectional camera is changed while the user is viewing an image captured by the omnidirectional camera and subjected to the camera shake correction, the user recognizes a direction to which the image displayed on the head-mounted display changes and then changes the direction in which the user faces. Accordingly, the user changes the direction in which the user faces long after the camera has changed the direction.

SUMMARY

According to a first aspect of the embodiments, there is provided an image adjustment system including: a camera; an image adjustment device configured to adjust a captured image captured by the camera; an image display device configured to display the captured image adjusted by the image adjustment device; and a controller configured to output instruction information to the image adjustment device, wherein the image adjustment device includes: an image generator configured to generate a spherical surface image; and an image processor configured to acquire the spherical surface image from the image generator to display the spherical surface image on the image display device on the basis of the instruction information, rotate the spherical surface image on the basis of the instruction information, adjust the captured image displayed on the image display device in accordance with a rotation of the spherical surface image, correct camera shake in the captured image that is adjusted, determine whether the captured image that is camera-shake corrected is changed by a predetermined angle or greater, and determine that a travel direction of the camera is changed when it is determined that the captured image is changed by the predetermined angle or greater.

According to a second aspect of the embodiments, there is provided an image adjustment system including: a camera; an image adjustment device configured to adjust a captured image captured by the camera; an image display device configured to display the captured image adjusted by the image adjustment device; and a controller configured to output instruction information to the image adjustment device, wherein the image adjustment device includes: an image generator configured to generate a spherical surface image; and an image processor configured to acquire the spherical surface image from the image generator to display the spherical surface image on the image display device on the basis of the instruction information, rotate the spherical surface image on the basis of the instruction information, adjust the captured image displayed on the image display device in accordance with a rotation of the spherical surface image, correct camera shake in the captured image that is adjusted, determine whether a camera shake correction follows with respect to the captured image, and adjust the captured image on the basis of the instruction information when it is determined that the camera shake correction does not follow with respect to the captured image.

According to a third aspect of the embodiments, there is provided an image adjustment device including: an image generator configured to generate a spherical surface image; and an image processor configured to acquire the spherical surface image from the image generator on the basis of instruction information acquired from a glove type controller to display the spherical surface image on an image display device, rotate the spherical surface image on the basis of the instruction information, adjust a captured image captured by a camera and displayed on the image display device in accordance with a rotation of the spherical surface image, correct camera shake in the captured image that is adjusted, determine whether the captured image that is camera-shake corrected is changed by a predetermined angle or greater, and determine that a travel direction of the camera is changed when it is determined that the captured image is changed by the predetermined angle or greater.

According to a fourth aspect of the embodiments, there is provided an image adjustment device including: an image generator configured to generate a spherical surface image; and an image processor configured to acquire the spherical surface image from the image generator on the basis of instruction information acquired from a glove type controller to display the spherical surface image on an image display device, rotate the spherical surface image on the basis of the instruction information, adjust a captured image captured by a camera and displayed on the image display device in accordance with a rotation of the spherical surface image, correct camera shake in the captured image that is adjusted, determine whether the camera shake correction follows with respect to the captured image, and adjust the captured image on the basis of the instruction information when it is determined that the camera shake correction does not follow with respect to the captured image.

According to a fifth aspect of the embodiments, there is provided a method of adjusting an image including: acquiring instruction information from a glove-type controller by an image processor; acquiring a spherical surface image from an image generator by the image processor on the basis of the instruction information; displaying the spherical surface image by an image display device; rotating the spherical surface image by the image processor on the basis of the instruction information; adjusting by the image processor a captured image captured by a camera and displayed on the image display device in accordance with a rotation of the spherical surface image; correcting by the image processor camera shake in the captured image that is adjusted; determining whether the captured image that is camera-shake corrected is changed by a predetermined angle or greater; and determining that a travel direction of the camera is changed when it is determined that the captured image is changed by the predetermined angle or greater.

According to a sixth aspect of the embodiments, there is provided a method of adjusting an image including: acquiring instruction information from a glove-type controller by an image processor; acquiring a spherical surface image from an image generator by the image processor on the basis of the instruction information; displaying the spherical surface image by an image display device; rotating the spherical surface image by the image processor on the basis of the instruction information; adjusting by the image processor a captured image captured by a camera and displayed on the image display device in accordance with a rotation of the spherical surface image; correcting by the image processor camera shake in the captured image that is adjusted; determining by the image processor whether the camera shake correction follows with respect to the captured image; and adjusting by the image processor the captured image on the basis of the instruction information when it is determined that the camera shake correction does not follow with respect to the captured image.

BRIEF DESCRIPTION OF THE DRAWINGS

FIG. 3 is a flowchart illustrating an example of an image adjustment method according to the first embodiment.

FIG. 4A is a flowchart illustrating an example of an image adjustment method according to a second embodiment.

DETAILED DESCRIPTION

First Embodiment

Figure 1:
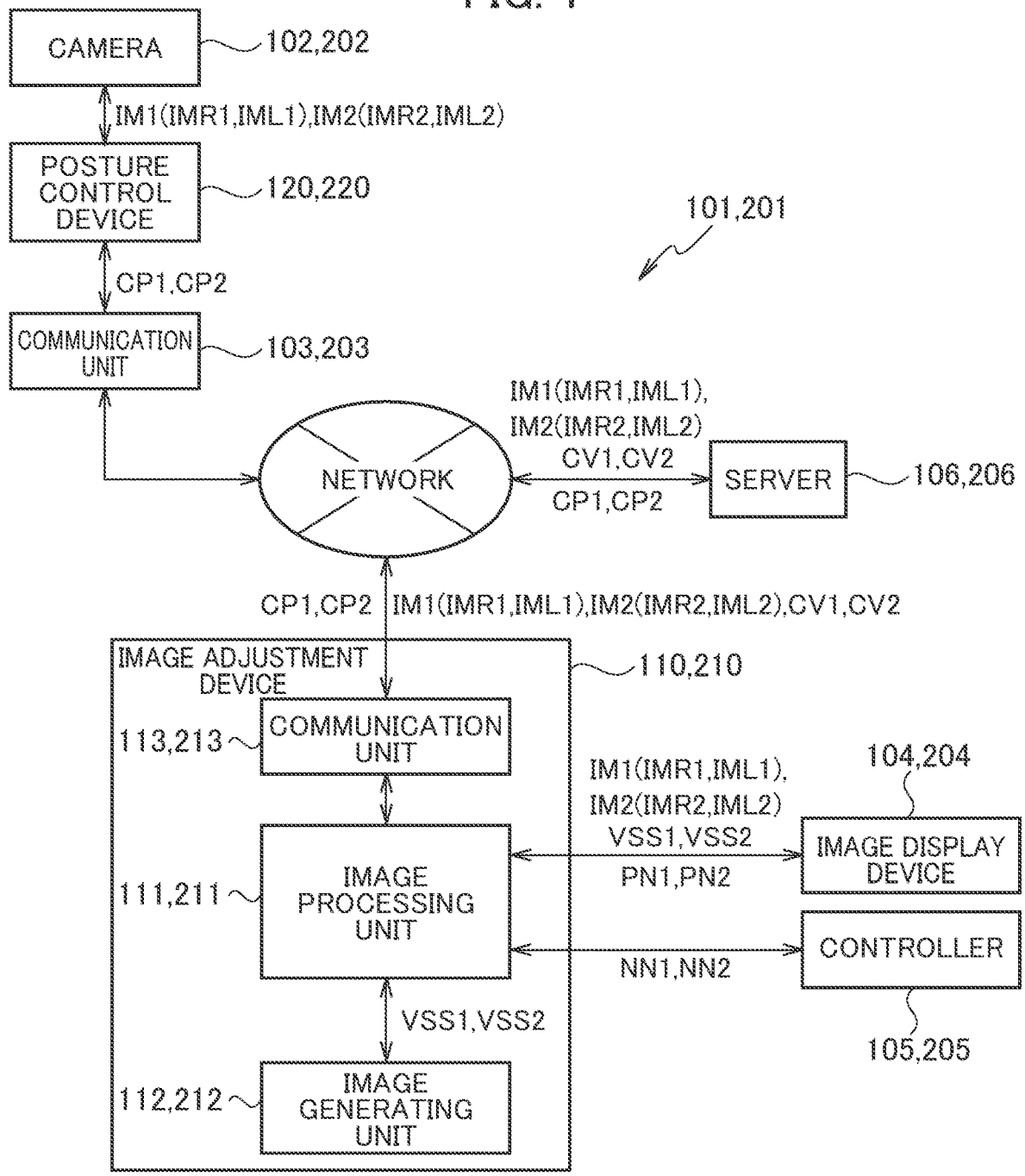
FIG. 1 is a block diagram illustrating an image adjustment system according to a first embodiment.

An example of the configuration of an image adjustment system according to a first embodiment is described below with reference to FIG. 1. An image adjustment system 101 includes a camera 102, a posture control device 120, a communication unit 103, an image display device 104, a controller 105, an image adjustment device 110, and a server 106. The image adjustment device 110 includes an image processing unit (image processor) 111, an image generating unit (image generator) 112, and a communication unit 113.

The camera 102 is an omnidirectional camera (360-degree camera) capable of capturing the range of 360 degrees. The camera 102 may be an omnidirectional camera made up from a stereo camera capable of capturing a right-eye image and a left-eye image. The communication unit 103 and the communication unit 113 are connected through a network.

The image adjustment device 110 can acquire a captured image IM1 captured by the camera 102 in the range of 360 degrees through the communication units 103, 113 and the network. The image adjustment device 110 can acquire a right-eye image IMR1 and a left-eye image IML1 captured by the camera 102 in the range of 360 degrees as the captured image IM1 through the communication units 103, 113 and the network.

Computer equipment may be used as the image adjustment device 110. A CPU may be used as the image processing unit 111 and the image generating unit 112. The image generating unit 112 and the communication unit 113 may be provided outside the image adjustment device 110.

The server 106 is connected to the camera 102 through the network and the communication unit 103 and connected to the image adjustment device 110 through the network and the communication unit 113. The server 106 may acquire the captured image IM1 from the camera 102 through the communication unit 103 and the network, and the image adjustment device 110 may acquire the captured image IM1 from the server 106 through the network and the communication unit 113.

The captured image IM1 acquired by the image adjustment device 110 is input to the image processing unit 111. The image adjustment device 110 (specifically, image processing unit 111) has a camera shake correction function. The image adjustment device 110 performs image processing, such as correction of distortion and camera shake in the captured image IM1, and outputs the captured image IM1 that is image-processed to the image display device 104. The image display device 104 is, for example, a head-mounted display. The controller 105 is, for example, a glove type controller used for VR or the like.

The posture control device 120 controls the posture of the camera 102. The posture control device 120 may generate camera posture information CP1 indicating a direction the camera 102 faces and a direction and an angle when the camera 102 changes its direction. The image processing unit 111 can acquire the camera posture information CP1 from the posture control device 120 through the communication units 113, 103 and the network. The server 106 may acquire the camera posture information CP1 from the posture control device 120, and the image processing unit 111 may acquire the camera posture information CP1 from the server 106.

Figure 2:
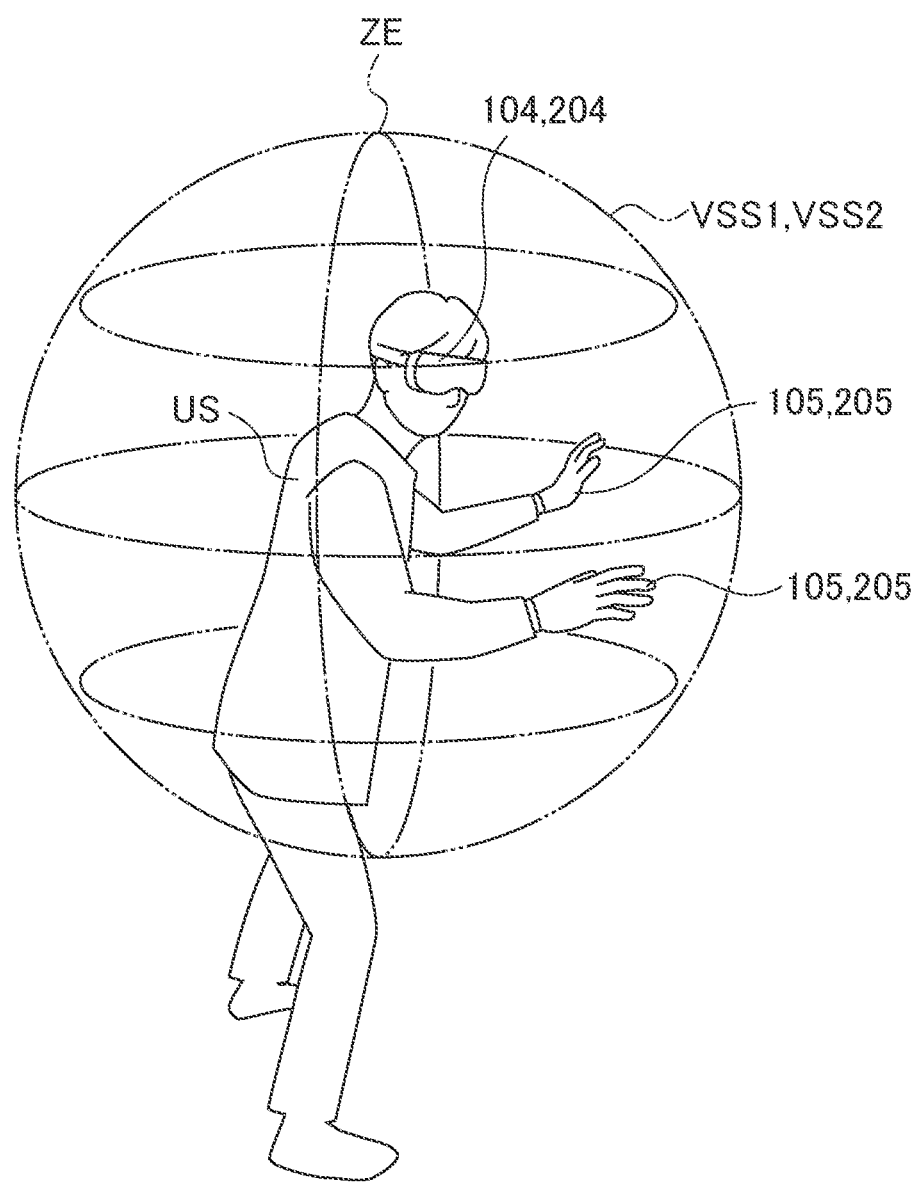
FIG. 2 is a diagram illustrating a relationship between a spherical surface image and a user.

FIG. 2 schematically illustrates the image display device 104 being mounted on the head of a user US and the controller 105 being attached to the hand of the user US. The zenith is indicated by a symbol ZE in FIG. 2. It is desirable that the zenith of the camera 102 and the zenith of the user US coincide. By mounting the image display device 104 on the head, the user US can view the captured image IM1 that is image-processed by the image adjustment device 110.

When the camera 102 is an omnidirectional camera made up from a stereo camera, with the image display device 104 mounted on the head of the user US, the image adjustment device 110 displays the right-eye image IMR1 in an area corresponding to the right eye of the user US and the left-eye image IML1 in an area corresponding to the left eye of the user US, so that the user US can view the captured image IM1 as a three-dimensional image.

The server 106 may correct distortion of the captured image IM1 acquired from the camera 102, perform image processing, such as adjustment of the horizontal position of the captured image IM1, and output the captured image IM1 that is image-processed to the image adjustment device 110. By mounting the image display device 104 on the head, the user US can view the captured image IM1 that is image-processed by the image adjustment device 110 or the server 106.

The image display device 104 generates user posture information PN1 on the basis of a state of the user US, such as a direction in which the user US faces or a posture of the user US, while being mounted on the head of the user US. The image processing unit 111 acquires the user posture information PN1 from the image display device 104. That is, the image processing unit 111 acquires the user posture information PN1 on the basis of the posture of the image display device 104. The image processing unit 111 displays on the image display device 104 an image of an area corresponding to the state of the user US, such as a direction in which the user US faces or a posture of the user US, from the captured image IM1 on the basis of the user posture information PN1.

The controller 105 generates instruction information NN1 on the basis of a state of the user US, such as a movement of a hand or a posture of the user US or a movement of a finger or a posture of the user US, while being attached to the hand of the user US. Hereinafter, the hand or finger is simply abbreviated as the hand. The image processing unit 111 acquires the instruction information NN1 from the controller 105. The image processing unit 111 can change or adjust the captured image IM1 displayed on the image display device 104 on the basis of the instruction information NN1.

The image generating unit 112 generates a spherical surface image VSS1 that is a virtual image made up by a spherical surface, which is CG (Computer Graphics), and stores the spherical surface image VSS1 in an internal memory or an external memory. The image processing unit 111 acquires the spherical surface image VSS1 from the image generating unit 112 on the basis of the instruction information NN1 and displays the spherical surface image VSS1 on the image display device 104.

FIG. 2 schematically illustrates an image of the user US with the image display device 104 mounted on the head of the user US when the user US views the spherical surface image VSS1 displayed on the image display device 104.

When the user US views the spherical surface image VSS1 displayed on the image display device 104 with the image display device 104 mounted on the head of the user US, the spherical surface image VSS1 is arranged around the user US and the image display device 104 and is set to be displayed within reach of the hand of the user US on the spherical surface image VSS1. The user US feels as if the hand of the user US is in contact with the spherical surface image VSS1 by moving the hand to which the controller 105 is attached to a position corresponding to the spherical surface image VSS1 displayed on the image display device 104.

The controller 105 may include an actuator arranged at a part to be in contact with the hand of the user US. The image processing unit 111 operates the actuator when determining that the hand of the user US has moved to a position corresponding to the spherical surface image VSS1 on the basis of the instruction information NN1. When the actuator applies pressure to the hand of the user US, the user US can actually obtain a sense of the hand in contact with the spherical surface image VSS1.

When the spherical surface image VSS1 is displayed on the image display device 104 and the user US moves the hand to which the controller 105 is attached in an arbitrary direction, the image processing unit 111 performs image processing on the basis of the instruction information NN1 so that the spherical surface image VSS1 and the captured image IM1 displayed on the image display device 104 move in accordance with a moving direction, a moving speed, and a destination position of the hand of the user US.

The user US can rotate the spherical surface image VSS1 in any direction, at any speed, to any position by moving the hand in any direction, at any speed, to any position. That is, the user US can rotate the spherical surface image VSS1 by the movement of the hand. The image processing unit 111 moves the captured image IM1 in accordance with the rotation of the spherical surface image VSS1. The user US rotates the spherical surface image VSS1 and thus can make the captured image IM1 displayed on the image display device 104 horizontal.

When the right-eye image IMR1 and the left-eye image IML1 are displayed on the image display device 104, the user US can correct a misalignment between the right-eye image IMR1 and the left-eye image IML1 in an up-down direction (vertical direction) by rotating the spherical surface image VSS1, for example, upward or downward. The user US can correct a parallax between the right-eye image IMR1 and the left-eye image IML1 by rotating the spherical surface image VSS1, for example, rightward or leftward. The user US can correct a difference in tilt between the right-eye image IMR1 and the left-eye image IML1 by rotating the spherical surface image VSS1 in an arbitrary direction.

The image processing unit 111 can determine a position on the coordinate of the spherical surface image VSS1 to which the zenith ZE before rotation of the spherical surface image VSS1 by the user US has moved by the rotation of the spherical surface image VSS1 by the user US. The image processing unit 111 calculates the amount of change of the spherical surface image VSS1 before and after the rotation of the spherical surface image VSS1 by the user US on the basis of the direction of movement and the position of the destination of the zenith ZE on the coordinate of the spherical surface image VSS1.

The amount of change of the spherical surface image VSS1 corresponds to the amount of rotation (rotation angle) of the spherical surface image VSS1 acquired by combining the amount of rotation about the X axis (rotation angle), the amount of rotation about the Y axis (rotation angle), and the amount of rotation about the Z axis (rotation angle) in the spherical surface image VSS1. The image processing unit 111 stores the amount of change of the spherical surface image VSS1 as a correction value CV1. That is, the correction value CV1 is calculated on the basis of the rotation direction of the spherical surface image VSS1 and the moving amount or the moving angle (rotation angle of spherical surface image VSS1) of the zenith ZE.

The image processing unit 111 may store the coordinates of the zenith ZE on the spherical surface image VSS1 after the rotation of the spherical surface image VSS1 by the user US as the correction value CV1. The image processing unit 111 stores the correction value CV1 in an internal memory or an external memory. The image processing unit 111 may output the correction value CV1 to the server 106 through the communication unit 113 and the network, and the server 106 may store the correction value CV1 in an internal memory or an external memory. The image processing unit 111 can acquire the correction value CV1 stored in the server 106 through the network and the communication unit 113.

With reference to a flowchart in FIG. 3, an example of an image adjustment method according to the first embodiment is described. Specifically, an example of a method of quickly changing the direction in which the user US faces in accordance with a change in the travel direction of the camera 102 is described. The image display device 104 is mounted on the head of the user US, and the controller 105 is attached to the hand of the user US. Displayed on the image display device 104 are the captured image IM1 and the spherical surface image VSS1.

When the user US rotates the spherical surface image VSS1, the controller 105 generates the instruction information NN1 corresponding to the operation content and outputs the instruction information NN1 to the image processing unit 111 in step S101. The image processing unit 111 moves the captured image IM1 displayed on the image display device 104 in accordance with the rotation of the spherical surface image VSS1 on the basis of the instruction information NN1 in step S102. When the correction value CV1 is stored in the image processing unit 111 or the server 106, the image processing unit 111 may move the captured image IM1 displayed on the image display device 104 on the basis of the correction value CV1 in step S102.

Accordingly, the image adjustment device 110 can adjust the captured image IM1 so that the captured image IM1 is horizontal. The posture control device 120 may control the posture of the camera 102 so that the captured image IM1 is horizontal.

When the right-eye image IMR1 and the left-eye image IML1 are displayed on the image display device 104, the image adjustment device 110 corrects at least one of a misalignment in the up-down direction between the right-eye image IMR1 and the left-eye image IML1, a parallax between the right-eye image IMR1 and the left-eye image IML1, or a difference in tilt between the right-eye image IMR1 and the left-eye image IML1 by the user US rotating the spherical surface image VSS1. The posture control device 120 may correct the misalignment in the up-down direction between the right-eye image IMR1 and the left-eye image IML1 by controlling the posture of the camera 102.

When the correction value CV1 is stored in the image processing unit 111 or the server 106, the image processing unit 111 may move the right-eye image IMR1 or the left-eye image IML1 in the captured image IM1 displayed on the image display device 104 on the basis of the correction value CV1. Thus, the image adjustment device 110 can adjust the captured image IM1 so that the misalignment or parallax between the right-eye image IMR1 and the left-eye image IML1 is corrected.

In a state where the captured image IM1 is adjusted to be horizontal, or in a state where the misalignment or parallax between the right-eye image IMR1 and the left-eye image IML1 is corrected, the image processing unit 11 corrects camera shake in the captured image IM1 in step S103.

The image adjustment device 110 (specifically, image processing unit 111) constantly monitors the direction to which the captured image IM1 is changed and its angle. The image adjustment device 110 may detect the direction and its angle of the captured image IM1 from the captured image IM1 captured by the camera 102 or may detect the direction and its angle of the captured image IM1 on the basis of the camera posture information CP1 acquired from the posture control device 120.

In step S104, the image processing unit 111 determines whether an angle θa by which the captured image IM1 is changed is equal to or greater than a predetermined angle α. In other words, it is determined whether the captured image IM1 is changed by the predetermined angle α or greater. The predetermined angle α is, for example, 60 degrees.

When it is determined that the angle θa is equal to or greater than the predetermined angle α (θa≥α) (YES), that is, when it is determined that the captured image IM1 is changed by the predetermined angle α or greater, the image processing unit 111 determines in step S105 that the travel direction of the camera 102 is changed, and detects the direction of change.

When it is determined that the angle θa is not equal to or greater than the predetermined angle α (θa<α) (NO), that is, when it is determined that the captured image IM1 is not changed by the predetermined angle α or greater, the image processing unit 111 determines that the travel direction of the camera 102 is not changed, and returns the processing to step S104.

In step S106, the image processing unit 111 detects the direction in which the user US faces on the basis of the user posture information PN1. The image generation unit 112 generates an arrow image AR. The arrow image AR is an image (CG) indicating a direction to which the travel direction of the camera 102 is changed. The image generating unit 112 generates, for example, a right arrow image ARR indicating a right direction and a left arrow image ARL indicating a left direction. In step S107, the image processing unit 111 acquires the arrow image AR from the image generating unit 112 and displays the arrow image AR on the image display device 104. Displayed on the image display device 104 is a combination of the captured image IM1 and the arrow image AR.

When determining that the travel direction of the camera 102 is changed to the right with respect to the direction in which the user US faces, the image processing unit 111 acquires the right arrow image ARR from the image processing unit 112 and displays the right arrow image ARR on the image display device 104. When determining that the travel direction of the camera 102 is changed to the left with respect to the direction in which the user US faces, the image processing unit 111 acquires the left arrow image ARL from the image processing unit 112 and displays the left arrow image ARL on the image display device 104.

In step S108, the image processing unit 111 may move the captured image IM1 displayed on the image display device 104 by an angle of change in a direction opposite to the direction to which the travel direction of the camera 102 is changed with respect to the direction in which the user US faces.

In the image adjustment system 101, the image adjustment device 110, and the image adjustment method according to the first embodiment, it is determined whether the travel direction of the camera 102 is changed in a state where the camera shake in the captured image IM1 is corrected, and when it is determined that the travel direction is changed, the image (for example, arrow image AR) indicating the direction to which the travel direction of the camera 102 is changed is displayed. Thus, the direction in which the user US faces is quickly changed in accordance with the change in the travel direction of the camera 102.

In the image adjustment system 101, the image adjustment device 110, and the image adjustment method according to the first embodiment, when it is determined that the travel direction of the camera 102 is changed in a state where the camera shake in the captured image IM1 is corrected, the captured image IM1 displayed on the image display device 104 is moved by an angle of change in a direction opposite to the direction to which the travel direction of the camera 102 is changed. Thus, the image displayed on the image display device 104 is quickly changed to correspond to the direction to which the travel direction of the camera 102 is changed.

Second Embodiment

An example of the configuration of an image adjustment system according to a second embodiment is described with reference to FIG. 1. An image adjustment system 201 includes a camera 202, a posture control device 220, a communication unit 203, an image display device 204, a controller 205, an image adjustment device 210, and a server 206. The image adjustment device 210 includes an image processing unit (image processor) 211, an image generating unit (image generator) 212, and a communication unit 213.

The camera 202, the posture control device 220, the communication unit 203, the image display device 204, the controller 205, the image adjustment device 210, and the server 206 correspond to the posture control device 120, the communication unit 103, the image display device 104, the controller 105, the image adjustment device 110, and the server 106 according to the first embodiment, respectively. The image processing unit 211, the image generating unit 212, and the communication unit 213 correspond to the image processing unit 111, the image generating unit 112, and the communication unit 113 according to the first embodiment, respectively.

The image adjustment device 210 can acquire a captured image IM2 captured by the camera 202 in the range of 360 degrees through the communication units 203, 213 and a network. When the camera 202 is an omnidirectional camera made up from a stereo camera, the image adjustment device 210 can acquire a right-eye image IMR2 and a left-eye image IML2 captured by the camera 202 in the range of 360 degrees as the captured image IM2 through the communication units 203, 213 and the network.

The captured image IM2 acquired by the image adjustment device 210 is input to the image processing unit 211. The image adjustment device 210 (specifically, image processing unit 211) has a camera shake correction function. The image adjustment device 210 performs image processing, such as correction of distortion and camera shake of the captured image IM2, and outputs the captured image IM2 that is image-processed to the image display device 204.

The posture control device 220 controls the posture of the camera 202. The posture control device 220 may generate camera posture information CP2 indicating a direction the camera 202 faces and a direction and an angle when the camera 202 changes its direction. The image processing unit 211 can acquire the camera posture information CP2 from the posture control device 220 through the communication units 213, 203 and the network. The server 206 may acquire the camera posture information CP2 from the posture control device 220, and the image processing unit 211 may acquire the camera posture information CP2 from the server 206.

The server 206 may correct distortion of the captured image IM2 acquired from the camera 202, perform image processing, such as adjusting the horizontal position of the captured image IM2, and output the captured image IM2 that is image-processed to the image adjustment device 210. By mounting the image display device 204 on the head, the user US can view the captured image IM1 image-processed by the image adjustment device 210 or the server 206.

The image display device 204 generates user posture information PN2 on the basis of a state of the user US, such as a direction in which the user US faces or a posture of the user US, while being mounted on the head of the user US. The image processing unit 211 acquires the user posture information PN2 from the image display device 204. That is, the image processing unit 211 acquires the user posture information PN2 on the basis of the posture of the image display device 204. The image processing unit 211 displays on the image display device 204 an image of an area corresponding to the state of the user US, such as a direction in which the user US faces or a posture of the user US, from the captured image IM2 on the basis of the user posture information PN2.

The controller 205 generates instruction information NN2 on the basis of a state of the user US, such as a movement of the hand or a posture of the user US, while being attached to the hand of the user US. The image processing unit 211 acquires the instruction information NN2 from the controller 205. The image processing unit 211 can change or adjust the captured image IM2 displayed on the image display device 204 on the basis of the instruction information NN2.

The image generation unit 212 generates a spherical surface image VSS2 that is a virtual image made up by a spherical surface, which is CG, and stores the spherical surface image VSS2 in an internal memory or an external memory. The image processing unit 211 acquires the spherical surface image VSS2 from the image generating unit 212 on the basis of the instruction information NN2 and displays the spherical surface image VSS2 on the image display device 204.

FIG. 2 schematically illustrates an image of the user US with the image display device 204 mounted on the head of the user US when the user US views the spherical surface image VSS2 displayed on the image display device 204.

When the user US views the spherical surface image VSS2 displayed on the image display device 204 with the image display device 204 mounted on the head of the user US, the spherical surface image VSS2 is arranged around the user US and the image display device 204 and is set to be displayed within reach of the hand of the user US on the spherical surface image VSS2. The user US feels as if the hand of the user US is in contact with the spherical surface image VSS2 by moving the hand to which the controller 205 is attached to a position corresponding to the spherical surface image VSS2 displayed on the image display device 204.

The controller 205 may include an actuator arranged at a part to be in contact with the hand of the user US. The image processing unit 211 operates the actuator when determining that the hand of the user US has moved to a position corresponding to the spherical surface image VSS2 on the basis of the instruction information NN2. When the actuator applies pressure to the hand of the user US, the user US can actually obtain a sense of the hand in contact with the spherical surface image VSS2.

When the spherical surface image VSS2 is displayed on the image display device 204 and the user US moves the hand to which the controller 205 is attached in an arbitrary direction, the image processing unit 211 performs image processing on the basis of the instruction information NN2 so that the spherical surface image VSS2 and the captured image IM2 displayed on the image display device 204 move in accordance with a moving direction, a moving speed, and a destination position of the hand of the user US.

The user US can rotate the spherical surface image VSS2 in any direction, at any speed, to any position by moving the hand in any direction, at any speed, to any position. That is, the user US can rotate the spherical surface image VSS2 by the movement of the hand. The image processing unit 211 moves the captured image IM2 in accordance with the rotation of the spherical surface image VSS2. The user US rotates the spherical surface image VSS2 and thus can make the captured image IM2 displayed on the image display device 204 horizontal.

When the right-eye image IMR2 and the left-eye image IML2 are displayed on the image display device 204, the user US can correct a misalignment between the right-eye image IMR2 and the left-eye image IML2 in an up-down direction (vertical direction) by rotating the spherical surface image VSS2, for example, upward or downward. The user US can correct a parallax between the right-eye image IMR2 and the left-eye image IML2 by rotating the spherical surface image VSS2, for example, rightward or leftward. The user US can correct a difference in tilt between the right-eye image IMR2 and the left-eye image IML2 by rotating the spherical surface image VSS2 in an arbitrary direction.

The image processing unit 211 can determine a position on the coordinate of the spherical surface image VSS2 to which the zenith ZE before rotation of the spherical surface image VSS2 by the user US has moved by the rotation of the spherical surface image VSS2 by the user US. The image processing unit 211 calculates the amount of change of the spherical surface image VSS2 before and after the rotation of the spherical surface image VSS2 by the user US on the basis of the direction of movement and the position of the destination of the zenith ZE on the coordinate of the spherical surface image VSS2.

The amount of change of the spherical surface image VSS2 corresponds to that of the spherical surface image VSS1 according to the first embodiment. The image processing unit 211 stores the amount of change of the spherical surface image VSS2 as a correction value CV2. The correction value CV2 corresponds to the correction value CV1 according to the first embodiment.

The image processing unit 211 may store the coordinates of the zenith ZE on the spherical surface image VSS2 after the rotation of the spherical surface image VSS1 by the user US as the correction value CV2. The image processing unit 211 stores the correction value CV2 in an internal memory or an external memory. The image processing unit 211 outputs the correction value CV2 to the server 206 through the communication unit 213 and the network, and the server 206 may store the correction value CV2 in an internal memory or an external memory. The image processing unit 211 can acquire the correction value CV2 stored in the server 206 through the network and the communication unit 213.

Figure 4B:
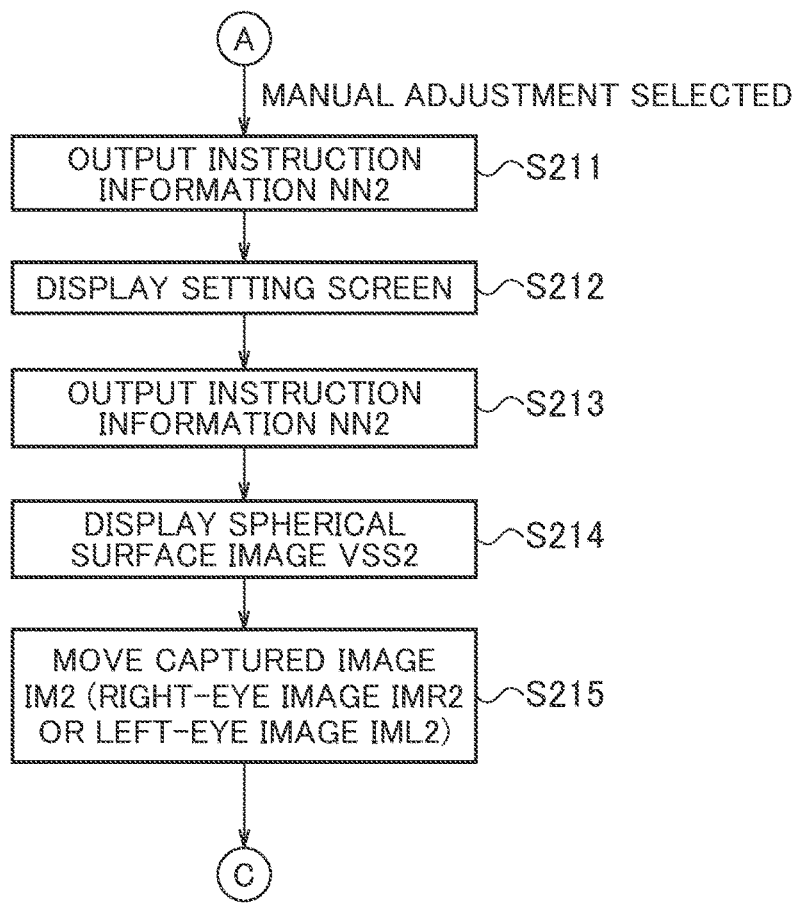
FIG. 4B is a flowchart illustrating an example of an image adjustment method according to the second embodiment.
Figure 4C:
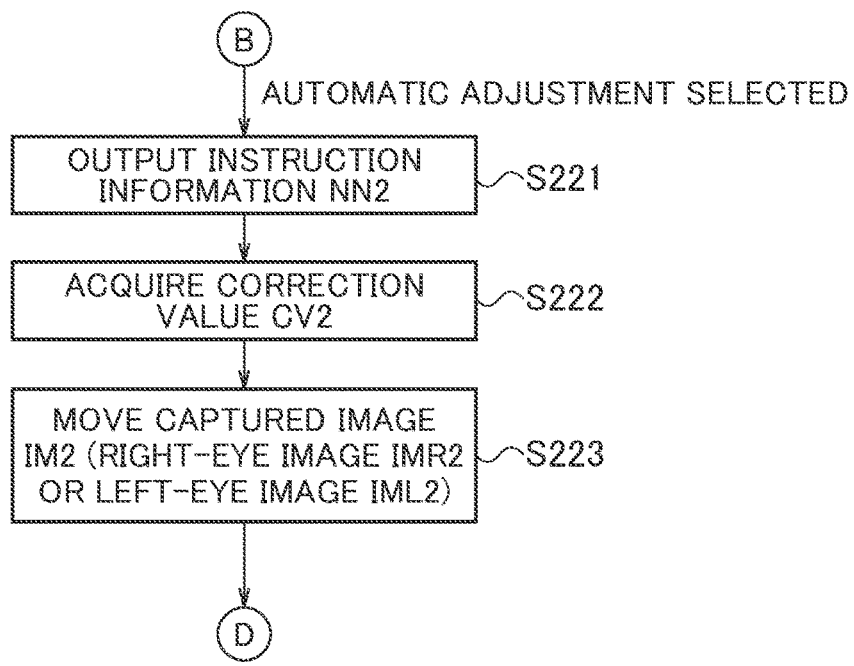
FIG. 4C is a flowchart illustrating an example of an image adjustment method according to the second embodiment.

With reference to flowcharts in FIGS. 4A to 4C, an example of an image adjustment method according to the second embodiment is described. Specifically, an example of a method of dealing with a case in which the camera-shake corrected state of the captured image IM2 cannot be maintained is described. The image display device 204 is mounted on the head of the user US, and the controller 205 is attached to the hand of the user US. Displayed on the image display device 204 are the captured image IM2 and the spherical surface image VSS2.

In FIG. 4A, when the user US rotates the spherical surface image VSS2, the controller 205 generates the instruction information NN2 corresponding to the operation content and outputs the instruction information NN2 to the image processing unit 211 in step S201. The image processing unit 211 moves the captured image IM2 displayed on the image display device 204 in accordance with the rotation of the spherical surface image VSS2 on the basis of the instruction information NN2 in step S202. When the correction value CV2 is stored in the image processing unit 211 or the server 206, the image processing unit 211 may move the captured image IM2 displayed on the image display device 204 on the basis of the correction value CV2 in step S202.

Accordingly, the image adjustment device 210 can adjust the captured image IM2 so that the captured image IM2 is horizontal. The posture controller 220 may control the posture of the camera 202 so that the captured image IM2 is horizontal.

When the right-eye image IMR2 and the left-eye image IML2 are displayed on the image display device 204, the image adjustment device 210 corrects at least one of a misalignment in the up-down direction between the right-eye image IMR2 and the left-eye image IML2, a parallax between the right-eye image IMR2 and the left-eye image IML2, or a difference in tilt between the right-eye image IMR2 and the left-eye image IML2 by the user US rotating the spherical surface image VSS2. The posture control device 220 may correct the misalignment in the up-down direction between the right-eye image IMR2 and the left-eye image IML2 by controlling the posture of the camera 202.

When the correction value CV2 is stored in the image processing unit 211 or the server 206, the image processing unit 211 may move the right-eye image IMR2 or the left-eye image IML2 in the captured image IM2 displayed on the image display device 204 on the basis of the correction value CV2. Thus, the image adjustment device 210 can adjust the captured image IM2 so that the misalignment or parallax between the right-eye image IMR2 and the left-eye image IML2 is corrected.

In a state where the captured image IM2 is adjusted to be horizontal, or in a state where the misalignment or parallax between the right-eye image IMR2 and the left-eye image IML2 is corrected, the image processing unit 211 corrects camera shake in the captured image IM2 in step S203. The image adjustment device 210 (specifically, image processing unit 211) constantly monitors the direction to which the captured image IM2 is changed and its angle. The image processing unit 211 performs similar processing as in steps S104 to S108.

When the camera 202 falls or moves violently, the camera shake correction may not be able to follow. The image adjustment device 210 (specifically, image processing unit 211) constantly monitors whether the camera shake correction with respect to the captured image IM2 follows. In step S204, the image processing unit 211 determines whether the camera shake correction follows, that is, whether the condition at the time of setting the camera shake correction is maintained. When it is determined that the camera shake correction follows (YES), the image adjustment device 210 returns the processing to step S204.

When it is determined that the camera shake correction does not follow (NO), the image adjustment device 210 confirms with the user US whether to adjust or how to adjust the captured image IM2 (right-eye image IMR2 or left-eye image IML2).

Specifically, in step S205, the image processing unit 211 causes the image display device 204 to display a setting screen for setting manual adjustment or automatic adjustment of the captured image IM2. The image processing unit 211 may cause the image display device 204 to display that the condition at the time of setting the camera shake correction is not maintained.

The image processing unit 211 may cause the image display device 204 to display a setting screen for setting manual adjustment, automatic adjustment, or no adjustment of the captured image IM2. When the user US selects an item for no adjustment, the controller 205 generates the instruction information NN2 corresponding to the operation content and outputs the instruction information NN2 to the image processing unit 211, and the image processing unit 211 returns the processing to step S203.

In step S205, when the user US selects an item for manual adjustment of the captured image IM2, in FIG. 4B, the controller 205 generates the instruction information NN2 corresponding to the operation content and outputs the instruction information NN2 to the image processing unit 211 in step S211. In step S212, the image processing unit 211 shifts the processing to the manual adjustment mode on the basis of the instruction information NN2 and causes the image display device 204 to display a setting screen for selecting an adjustment item.

When the user US operates the controller 205 to select a predetermined adjustment item (for example, horizontal adjustment item) displayed on the setting screen, the controller 205 generates the instruction information NN2 corresponding to the operation content and outputs the instruction information NN2 to the image processing unit 211 in step S213. The image processing unit 211 shifts the processing to a processing mode corresponding to the selected item on the basis of the instruction information NN2. When the item of horizontal adjustment is selected, the image processing unit 211 shifts the processing to a processing mode (horizontal adjustment mode) for adjusting the horizontal position of the captured image IM2.

In step S214, the image processing unit 211 acquires the spherical surface image VSS2 from the image generating unit 212 on the basis of the instruction information NN2 and displays the spherical surface image VSS2 on the image display device 204. Displayed on the image display device 204 is a blend of the captured image IM2 and the spherical surface image VSS2. The user US rotates the spherical surface image VSS2 so that the captured image IM2 is horizontal. In step S215, the image processing unit 211 moves the captured image IM2 displayed on the image display device 204 in accordance with the rotation of the spherical surface image VSS2. The user US may rotate the spherical surface image VSS2 multiple times until the captured image IM2 is horizontal.

In step S205, when the user US selects an item for automatic adjustment of the captured image IM2, in FIG. 4C, the controller 205 generates the instruction information NN2 corresponding to the operation content in step S221, and outputs the instruction information NN2 to the image processing unit 211. In step S222, the image processing unit 211 shifts the processing to the automatic adjustment mode on the basis of the instruction information NN2 and acquires the correction value CV2 stored in the image processing unit 211 or the server 206.

In step S223, the image processing unit 211 moves the captured image IM2 displayed on the image display device 204 on the basis of the correction value CV2. For example, the image processing unit 211 moves the captured image IM2 on the basis of the correction value CV2 so that the captured image IM2 is horizontal. Thus, the image adjustment device 210 can adjust the captured image IM2 so that the captured image IM2 is horizontal.

In step S205, when the user US selects the item for manual adjustment of the captured image IM2, and the right-eye image IMR2 and the left-eye image IML2 are displayed on the image display device 204, the image processing unit 211 displays a setting screen for selecting an adjustment item in step S212. Displayed on the setting screen are adjustment items, such as an item of up-down correction for correcting a misalignment in the up-down direction (vertical direction) between the right-eye image IMR2 and the left-eye image IML2, an item of parallax correction for correcting a parallax between the right-eye image IMR2 and the left-eye image IML2, and an item of tilt correction for correcting a difference in tilt between the right-eye image IMR2 and the left-eye image IML2.

When the user US selects either one of the items of up-down correction, parallax correction, and tilt correction displayed on the setting screen, the controller 205 outputs the instruction information NN2 including the selected item to the image processing unit 211 in step S213. The image processing unit 211 shifts the processing to a processing mode corresponding to the selected item on the basis of the instruction information NN2

When the item of up-down correction is selected in step S212, the image processing unit 211 shifts the processing to a processing mode (up-down correction mode) for correcting a misalignment in the up-down direction between the right-eye image IMR2 and the left-eye image IML2. When the item of parallax correction is selected in step S212, the image processing unit 211 shifts the processing to a processing mode (parallax correction mode) for correcting a parallax between the right-eye image IMR2 and the left-eye image IML2. When the item of tilt correction is selected in step S212, the image processing unit 211 shifts the processing to a processing mode (tilt correction mode) for correcting a difference in tilt between the right-eye image IMR2 and the left-eye image IML2.

The image processing unit 211 causes the image display device 204 to display an item for selecting whether the image to be corrected is the right-eye image IMR2 or the left-eye image IML2. When the user US selects the right-eye image IMR2, the controller 205 outputs the instruction information NN2 indicating the selection of the right-eye image IMR2 to the image processing unit 211. On the basis of the instruction information NN2, the image processing unit 211 shifts the processing to a processing mode (right-eye correction mode) for correcting the right-eye image IMR2.

When the user US selects the left-eye image IML2, the controller 205 outputs the instruction information NN2 indicating the selection of the left-eye image IML2 to the image processing unit 211. On the basis of the instruction information NN2, the image processing unit 211 shifts the processing to a processing mode (left-eye correction mode) for correcting the left-eye image IML2.

In step S214, the image processing unit 211 acquires the spherical surface image VSS2 from the image generating unit 212 on the basis of the instruction information NN2 and displays the spherical surface image VSS2 on the image display device 204. Displayed on the image display device 204 is a blend of the captured image IM2 and the spherical surface image VSS2.

The user US rotates the spherical surface image VSS2 so that no misalignment in the up-down direction or no difference in tilt is between the right-eye image IMR2 and the left-eye image IML2 or the parallax between the right-eye image IMR2 and the left-eye image IML2 becomes a target parallax. The image processing unit 211 moves the right-eye image IMR2 or the left-eye image IML2 that is selected displayed on the image display device 204 in accordance with the rotation of the spherical surface image VSS2 in in step S215. The user US may rotate the spherical surface image VSS2 multiple times.

In step S205, when the user US selects the item for automatic adjustment of the captured image IM2, and the right-eye image IMR2 and the left-eye image IML2 are displayed on the image display device 204, the image processing unit 211 reads the correction value CV2 stored in the image processing unit 211 or the server 206 in step S222.

In step S223, the image processing unit 211 moves the right-eye image IMR2 or the left-eye image IML2 corresponding to the correction value CV2 in the right-eye image IMR2 and the left-eye image IML2 displayed on the image display device 204 on the basis of the correction value CV2. Thus, the image adjustment device 210 can adjust the captured image IM2 so that no misalignment is between the right-eye image IMR2 and the left-eye image IML2 or the parallax between the right-eye image IMR2 and the left-eye image IML2 becomes a target parallax.

When the captured image IM2 is adjusted to be horizontal, or the misalignment or the parallax between the right-eye image IMR2 and the left-eye image IML2 is corrected, the image adjustment device 210 returns the processing to step S203.

When the user US does not select manual adjustment or automatic adjustment of the captured image IM2 in step S205, that is, when the instruction information NN2 is not output in steps S211 and S221, the image processing unit 211 may move the processing to step S222 of the automatic adjustment mode. When the correction value CV2 has not been stored in the image processing unit 211 or the server 206, the image processing unit 211 may move the processing from step S204 to step S212.

In the image adjustment system 201, the image adjustment device 210, and the image adjustment method according to the second embodiment, it is determined whether the travel direction of the camera 202 is changed in a state where the camera shake in the captured image IM2 is corrected, and when it is determined that the travel direction is changed, the image (for example, arrow image AR) indicating the direction to which the travel direction of the camera 202 is changed is displayed. Thus, the direction in which the user US faces is quickly changed in accordance with the change in the travel direction of the camera 202.

In the image adjustment system 201, the image adjustment device 210, and the image adjustment method according to the second embodiment, when it is determined that the travel direction of the camera 202 is changed in a state where the camera shake in the captured image IM2 is corrected, the captured image IM2 is moved by an angle of change in a direction opposite to the direction to which the travel direction of the camera 202 is changed. Thus, the image displayed on the image display device 204 is quickly changed to correspond to the direction to which the travel direction of the camera 202 is changed.

In the image adjustment system 201, the image adjustment device 210, and the image adjustment method according to the second embodiment, when the camera 202 falls or moves violently so that the camera shake correction cannot follow, that is, when the condition at the time of setting the camera shake correction is not maintained, the image adjustment device 210 confirms with the user US whether to adjust or how to adjust the captured image IM2 (right-eye image IMR2 or left-eye image IML2). The image adjustment device 210 adjusts the captured image IM2 in accordance with the instruction by the user US.

Accordingly, the image adjustment system 201 displays on the image display device 204 the captured image IM2 adjusted to be horizontal with the camera shake corrected. The image adjustment system 201 displays on the image display device 204 the captured image IM2 with the misalignment or the parallax between the right-eye image IMR2 and the left-eye image IML2 corrected and the camera shake corrected.

The present invention is not limited to the above-described embodiments, and various modifications can be made without departing from the gist of the present invention.

The first and second embodiments describe the configuration of the image adjustment devices 110 and 210 that have the camera shake correction function. However, the cameras 102 and 202, the posture control devices 120 and 220, or the servers 106 and 206 may have the camera shake correction function.

When the servers 106 and 206 have the camera shake correction function, the servers 106 and 206 correct camera shake in the captured images IM1 and IM2 acquired from the cameras 102, 202, respectively, in steps S103 and S203. In this case, the server 106 may perform the processing of steps S104 and S105, and the server 206 may perform the processing of step S204 to output the determination result in step S204 to the image adjustment device 210.

For example, a virtual image VSS generated by CG may be an ellipsoidal surface (ellipsoid) and may be any closed surface (closed surface) within reach of the hand of the user US. That is, it is only necessary to obtain a sense that the user US comes in contact with the closed surface from the inside, so that the horizontal adjustment of the captured image IM is performed. As the user US rotates the virtual image VSS, the virtual image VSS preferably has a spherical surface or a spherical shape close to a spherical surface, such as an ellipsoid.

The image adjustment system, the image adjustment device, and the image adjustment method according to the present embodiments quickly changes the direction in which the user faces in accordance with the change in the travel direction of the camera.

What is claimed is:

1. An image adjustment system, comprising:
   a camera;
   an image adjustment device configured to adjust a captured image captured by the camera;
   an image display device configured to display the captured image adjusted by the image adjustment device; and
   a controller configured to output instruction information to the image adjustment device, wherein
   the image adjustment device comprises:
   an image generator configured to generate a spherical surface image; and
   an image processor configured to acquire the spherical surface image from the image generator to display the spherical surface image on the image display device on the basis of the instruction information, rotate the spherical surface image on the basis of the instruction information, adjust the captured image displayed on the image display device in accordance with a rotation of the spherical surface image, correct camera shake in the captured image that is adjusted, determine whether the captured image that is camera-shake corrected is changed by a predetermined angle or greater, and determine that a travel direction of the camera is changed when it is determined that the captured image is changed by the predetermined angle or greater, wherein
   the camera is an omnidirectional camera configured to capture a range of 360 degrees,
   the image display device is a head-mounted display mountable on a head of a user,
   the controller is a glove type controller attachable to a hand of the user, and when the user views the spherical surface image displayed on the image display device with the image display device mounted on the head of the user, the spherical surface image is a virtual image arranged around the user and the image display device and set to be displayed within reach of the hand or a finger of the user on the spherical surface image.

2. The image adjustment system according to claim 1, wherein
when the user moves the hand or the finger of the user to an arbitrary direction with the controller attached to the hand of the user, the image processor rotates the spherical surface image in accordance with a movement of the hand or the finger of the user on the basis of the instruction information and adjusts the captured image displayed on the image display device in accordance with a rotation of the spherical surface image.

3. The image adjustment system according to claim 2, wherein
the image processor acquires an amount of change before and after a rotation of the spherical surface image and adjusts the captured image in accordance with the amount of change.

4. The image adjustment system according to claim 1, wherein
the image processor displays an image indicating a direction to which the travel direction of the camera is changed on the image display device.

5. The image adjustment system according to claim 1, wherein
the image processor moves the captured image displayed on the image display device in a direction opposite to a direction to which the travel direction of the camera is changed.

6. The image adjustment system according to claim 1, wherein
the image processor determines whether a camera shake correction follows with respect to the captured image and adjusts the captured image on the basis of the instruction information when it is determined that the camera shake correction does not follow with respect to the captured image.

7. The image adjustment system according to claim 6, wherein
when it is determined that the camera shake correction does not follow with respect to the captured image, the image processor adjusts the captured image displayed on the image display device on the basis of the instruction information and corrects camera shake in the captured image that is adjusted.

8. An image adjustment device, comprising:
an image generator configured to generate a spherical surface image; and
an image processor configured to acquire the spherical surface image from the image generator on the basis of instruction information acquired from a glove type controller to display the spherical surface image on an image display device, rotate the spherical surface image on the basis of the instruction information, adjust a captured image captured by a camera and displayed on the image display device in accordance with a rotation of the spherical surface image, correct camera shake in the captured image that is adjusted, determine whether the captured image that is camera-shake corrected is changed by a predetermined angle or greater, and determine that a travel direction of the camera is changed when it is determined that the captured image is changed by the predetermined angle or greater.

9. The image adjustment device according to claim 8, wherein
the image processor determines whether the camera shake correction follows with respect to the captured image and adjusts the captured image on the basis of the instruction information when it is determined that the camera shake correction does not follow with respect to the captured image.

10. A method of adjusting an image, comprising:
acquiring instruction information from a glove-type controller by an image processor;
acquiring a spherical surface image from an image generator by the image processor on the basis of the instruction information;
displaying the spherical surface image by an image display device;
rotating the spherical surface image by the image processor on the basis of the instruction information;
adjusting by the image processor a captured image captured by a camera and displayed on the image display device in accordance with a rotation of the spherical surface image;
correcting by the image processor camera shake in the captured image that is adjusted;
determining by the image processor whether the captured image that is camera-shake corrected is changed by a predetermined angle or greater; and
determining by the image processor that a travel direction of the camera is changed when it is determined that the captured image is changed by the predetermined angle or greater.

11. The method according to claim 10, further comprising:
determining by the image processor whether the camera shake correction follows with respect to the captured image; and
adjusting by the image processor the captured image on the basis of the instruction information when it is determined that the camera shake correction does not follow with respect to the captured image.

* * * * *